United States Patent [19]

Taylor

[11] Patent Number: 4,651,792
[45] Date of Patent: Mar. 24, 1987

[54] AUTOMATIC TIRE PRESSURIZING SYSTEM
[75] Inventor: Robert D. Taylor, Clearlake, Calif.
[73] Assignee: Allen F. Ehle, Santa Rosa, Calif.
[21] Appl. No.: 626,772
[22] Filed: Jul. 2, 1984
[51] Int. Cl.⁴ .............................................. B60C 23/12
[52] U.S. Cl. ........................................ 152/415; 141/4;
141/198; 152/427; 417/211; 417/233
[58] Field of Search ............... 152/415, 418, 419, 429,
152/423–427; 141/4, 38, 67, 198; 116/34 R;
137/223, 224; 417/211, 229, 231, 233, 328

[56] References Cited
U.S. PATENT DOCUMENTS 939,020 11/1909 Hayne ................................. 152/425
2,719,560 10/1955 Caldwell ............................. 152/419

Primary Examiner—Edward Kimlin
Assistant Examiner—Thomas Bokan
Attorney, Agent, or Firm—David C. Ripma

[57] ABSTRACT

A tire pressurizing system is provided for automatically pressurizing a pneumatic tire. The system employs centrifugal force to actuate a pump which is attached to the interior of the tire. Centrifugal force causes a pump actuating member to follow a different orbital path around a rotating tire from the path of the pump housing, which is attached to the tire. The difference is due to the flexing of the tire in the load bearing "footprint" area. The result is reciprocation of the actuating member, which in turn operates a pump. Piston and diaphragm pump embodiments are disclosed. An automatic pressure regulator is also provided.

17 Claims, 7 Drawing Figures

AUTOMATIC TIRE PRESSURIZING SYSTEM

BACKGROUND OF THE INVENTION

This invention relates generally to a system for inflating and for maintaining the inflation of pneumatic tires and more specifically to an automatic tire inflation system which requires no outside source of pressurized air.

Pneumatic tires have a maximum service life and provide the best vehicular handling and safety when properly inflated. While the procedure for checking tire pressure and adding additional pressurized air when required is relatively simple, it is frequently neglected to the detriment of the consumer. Furthermore, during intervals between pressure checks, tires will lose a certain amount of pressure. It would therefore be desirable to have an effective system for continuously and automatically monitoring and maintaining the air pressure in pneumatic tires.

Previous attempts have been made to provide automatic tire inflators. Prior art devices generally consist of pumping mechanisms disposed within the tire which are operated by the compression or flexing of the tire. A lever arm is often provided in such devices, extending across the tire either laterally or radially to operate a pump. The usual experience with these prior art pumping systems is that the constant impact from contact between the lever arm and the tire quickly damages both the tire and pumping mechanism. Many prior art devices are also overly complex or require highly specialized attachment or bellows arrangements to function. Examples of prior art tire inflators are found in U.S. Pat. Nos. 939,020; 1,029,340; 1,327,371; 1,456,567; 2,021,646; 2,420,224 and 4,269,252.

It would be advantageous to have an automatic tire inflator which is simple and rugged and operates without damaging impact between the inflator and the tire. It would also be advantageous to have such a tire inflator which will automatically stop operating when the correct tire pressure is reached. It would also be desirable to have a tire inflator which is light in weight and easily installed in a pneumatic tire.

SUMMARY OF THE INVENTION

Accordingly, tire pressurizing means is provided for use with pneumatic tires. The tire pressurizing means comprises a pump housing and means for attaching the pump housing to the interior surface of a tire at a location adjacent the exterior road contact surface of the tire. A conduit is provided for supplying air from outside the tire to the pump housing. A pump within the pump housing serves to draw air through the conduit and pressurizes the air for delivery to the interior of the tire. The pump includes an actuating member responsive to the centrifugal force caused by tire rotation to actuate the pump. The actuating member is supported for movement relative to the pump housing in a direction generally radial with respect to the tire, between a radially inward first position and a radially outward second position. First biasing means are provided for urging the actuating member toward the first position while yielding to centrifugal force acting to urge the member toward the second position. The result is that the actuating member will tend to follow a different orbital path from that of the pump housing when rotating inside a tire having a flattened load bearing portion on its periphery. As such, the forces acting on the actuating member during tire rotation will alternate between centrifugal force moving the actuating member toward the second position and the first biasing means returning the actuating member toward the first position. The reciprocations of the actuating member will thereby serve to actuate the pump and pressurize the tire.

The invention also encompasses a method of pressurizing a pneumatic tire using pump means incorporated in a pump housing and actuated by an actuating member movable relative to the pump housing for pressurzing air. The method comprises steps which include attaching the pump housing to the interior surface of a tire at a location adjacent the exterior road contact surface of the tire. A supply of air is provided from outside the tire to the pump means. The actuating member, which is movable to actuate the pump means, is oriented for movement in a direction generally radial with respect to the tire between a radially inward first position and a radially outward second position. The actuating member is urged toward the first position using yieldable first biasing means such that the actuating member will be free to respond to the action of centrifugal force urging the actuating member toward the second position during tire rotation. The method includes permitting the member to follow a different orbital path due to centrifugal force from that of the pump housing, when rotating inside a tire having a flattened load bearing portion on its periphery. As a result, forces acting on the actuating member during tire rotation alternate between centrifugal force moving the actuating member toward the second position and the first biasing means returning the actuating member toward the first position. The result is reciprocation of the actuating member, which actuate the pump means and pressurize the tire.

DETAILED DESCRIPTION OF THE PREFERRED EMBODIMENT

Figure 1:
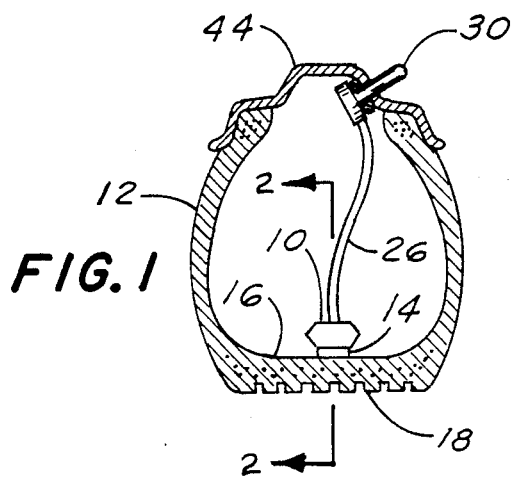
FIG. 1 is a cross sectional view of a portion of a tire showing the position of a tire pressurizing means according to the present invention.

Referring to FIG. 1, the tire pressurizing means of the present invention includes a pump housing 10 which is attached to the inside of a pneumatic tire 12. The pump housing 10 preferably includes an attaching base 14 which can be conveniently molded into the inside surface 16 of tire 12. Housing 10 could alternatively be attached to the tire by other means, but whatever attaching method is used must be capable of withstanding high stress and vibration without loosening. The housing 10 should be attached on the interior surface of the tire at a location adjacent the road contact surface (tread) 18. That location is the farthest outward, radially, from the center of the tire and consequently subjects the pump mechanism in housing 10 (described below) to the maximum centrifugal force.

Figure 2:
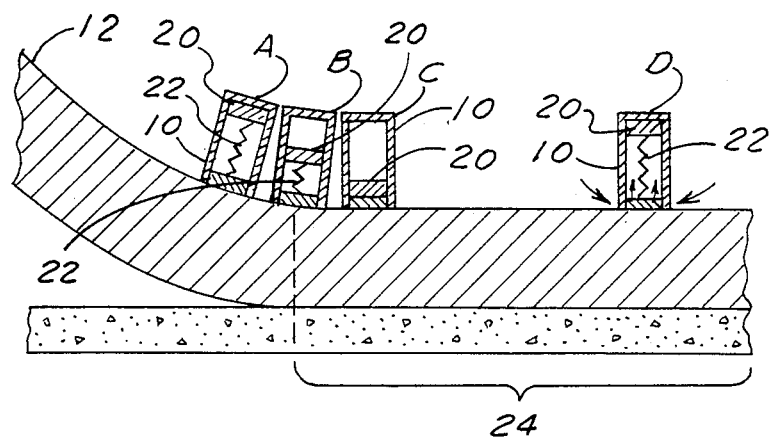
FIG. 2 is a cross sectional view of a portion of the tire shown in FIG. 1, taken along line 2—2, and illustrating the operation of the tire pressurizing means of the present invention.

The present invention makes use of centrifugal force to actuate a pressurizing pump, as illustrated in FIG. 2. Described in greater detail below, the basic principal of operation of the pump involves harnessing the centrifugal force acting on a small mass 20, called an actuating member. The actuating member is held radially inward in housing 10 by a spring or other biasing means 22. As the tire rotates, the housing 10 and actuating member 20 acquire inertia developed by centrifugal force. When the tire is load bearing, meaning it supports the weight of a vehicle or the like, it will have a flattened portion 24 on its periphery where the tire contacts the road surface. That flattened or load bearing portion (hereinafter called the "footprint"), is indicated in FIG. 2 by segment 24 of tire 12. As pump housing 10 orbits the tire and enters footprint 24, the centrifugal force acting on the housing is nullified. The centrifugal force acting on actuating member 20 will cause the actuating member to continue following its original orbital path within housing 10. In a vehicle moving to the left in FIG. 2, the relative positions of housing 10 and actuating member 20 before they reach footprint 24 is shown at "A." As the footprint is entered, housing 10 is deflected from its orbital path and actuating member 20 begins to move downward within the housing, as shown at "B." The actuating member is, in effect, attempting to follow its original orbital path and is carried downward by inertia in the housing until stopped at "C." When the centrifugal force on actuating member 20 is finally nullified, the force of spring 22 will return the actuating member to its original position, as shown at "D." The different orbital paths followed by housing 10 and actuating member 20 results in the motive force which operates the tire pressurizing pump of the present invention.

Figure 3:
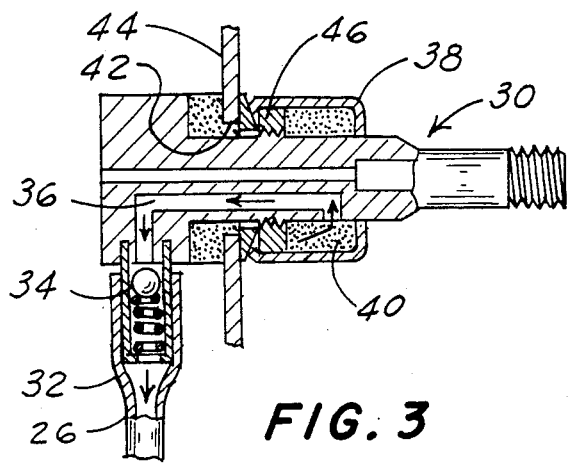
FIG. 3 is a cross sectional view of a modified valve stem for use with the present invention.
Figure 4:
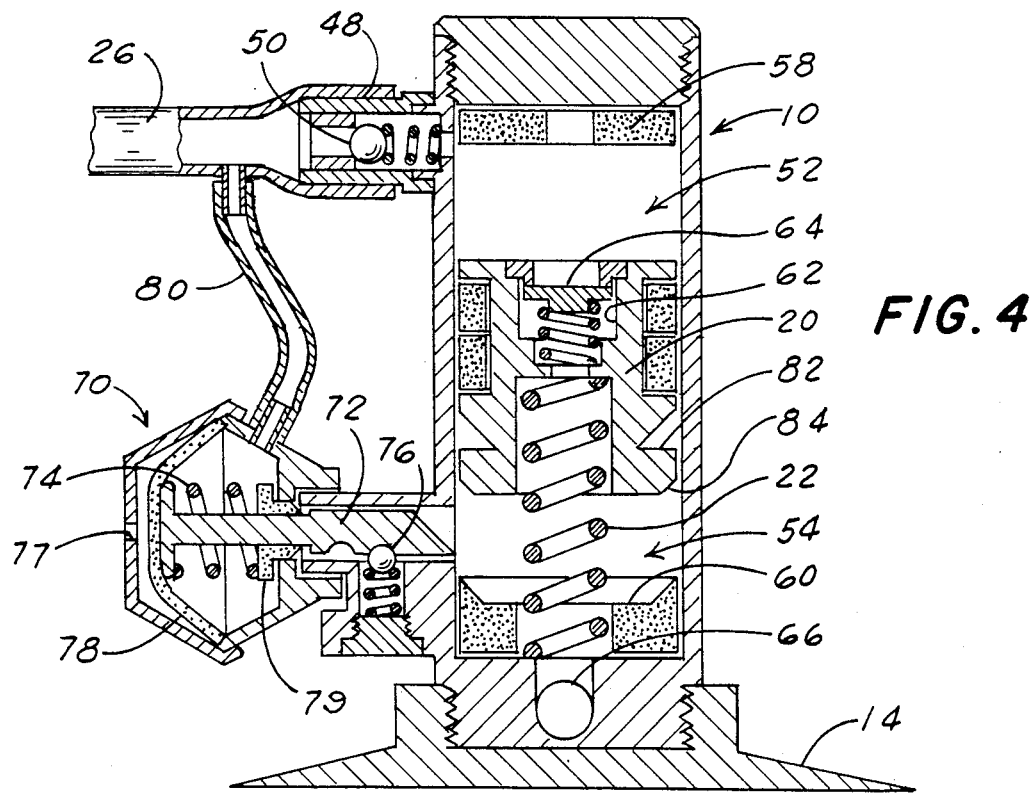
FIG. 4 is a cross sectional view of one embodiment of a tire pressurizing means according to the present invention.

FIGS. 1, 3 and 4 illustrate in greater detail the elements of the pump. A conduit 26 is connected between pump housing 10 and tire valve stem 30. The conduit carries air from outside the tire to the pump and is preferably formed of a non-collapsable material. The valve stem 30 shown in FIG. 3 is a modified form of a conventional valve stem. In addition to a conventional tire valve (not shown), valve stem 30 includes a fitting 32 for the connection of one end of conduit 26, and a check valve 34 for permitting one-way flow of air into conduit 26. A passage 36 in the body of valve stem 30 admits air from outside the tire to the inlet side of check valve 34, which can be a conventional ball valve. Air enters passage 36 through openings (not shown) in a valve cover 38, passing through filter material 40, which prevents particulate matter from entering. Valve stem 30 is mounted in the conventional manner in an opening 42 in tire rim 44. A hex nut 46 can be used to secure the valve stem 30 to the rim.

The other end of conduit 26 is connected to an air inlet 48 on pump housing 10 (FIG. 4). Air inlet 48 includes a one-way check valve 50, such as a ball-type valve, which allow outside air to enter pump housing 10. Pump housing 10 is divided into first and second pump chambers, 52 and 54, respectively. In the embodiment of FIG. 4, actuating member 20 is a piston which separates the first and second pump chambers. Air coming into the pump housing through conduit 26 enters first pump chamber 52, which is the low pressure side of the pump.

Actuating member 20 is movable relative to the pump housing in a direction generally radial with respect to tire 12. The actuating member is urged toward its radially inward position, termed the first position, at the top of the housing in FIG. 4, by a first biasing means such as spring 22, as was discussed with reference to FIG. 2. Spring 22 forces actuating member 20 against upper stop 58. Only when centrifugal force is sufficiently strong to overcome the force of spring 22 will the actuating member move away from stop 58, as shown in FIG. 4, and at "B" in FIG. 2. The radially outward position of actuating member 20, termed the second position, is illustrated at "C" in FIG. 2, and represents the maximum downward travel of actuating member 20, where it rests against lower stop 60.

Air flows between first and second pump chambers 52 and 54 through a passage 62 extending between the chambers. In the preferred embodiment passage 62 extends through the body of actuating member 20. A one way check valve 64, termed a first valve means, controls the air flow in passage 62, permitting air to flow only from chamber 52 to chamber 54. An outlet port 66 permits the flow of air from chamber 54 into the interior of tire 12. The chamber 54 serves as the high pressure side of the pump.

Figure 5:
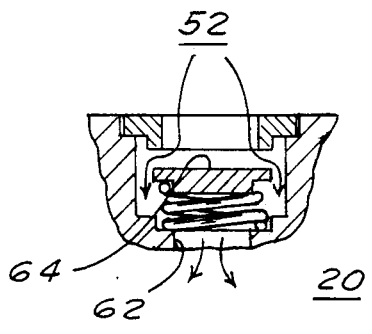
FIG. 5 is a cross sectional view of the check valve shown in FIG. 4, with the valve open.

Pumping of air to pressurize the tire is accomplished in the following manner, using the motion of actuating member 20 described above with reference to FIG. 2: When centrifugal force causes actuating member 20 to move downward (as viewed in FIG. 4) against the force of spring 22, the volume of first pump chamber 52 is increased, lowering the pressure inside. The partial vacuum draws air into chamber 52 through conduit 26 and through valves 34 and 50. The downward force of actuating member 20 also forces the air in chamber 54 out into the tire interior through outlet 66. When the centrifugal force is nullified, spring 22 begins to force the actuating member to the top again, compressing the air in chamber 52. At the point where the air pressure in chamber 52 equals the pressure in chamber 54, check valve 64 opens, as shown in FIG. 5, and air in chamber 52 moves to chamber 54. The pump is then ready for another cycle. Valve 50 prevents the air in chamber 52 from escaping through conduit 26, thus air is pressurized and pumped into the tire. In addition, as the actuating member moves upward, the air in chamber 54 will be cooled, due to decompression, preventing overheating of the pump.

In order to prevent overpressurizing tire 12, a pressure regulator is provided for halting the operation of the pump when a selected ambient pressure is reached. In the embodiment of FIG. 4, the pressure regulator is of the diaphram type, indicated generally at 70. Pressure regulator 70 includes a latch piece 72 which is movable laterally with respect to actuating member 20. FIG. 4 illustrates the latch piece in its nonengaging position, retracted out of the path of actuating member 20. Spring 74 and detent means 76 hold the latch piece in the retracted position until the ambient pressure reaches a selected limit, determined by the force of spring 74. An orifice 77 admits ambient air from inside the tire against diaphram 78. To protect against leakage of pressurized air around latch seal 79, a pressure release conduit 80 can be connected to conduit 26 to maintain low pressure behind diaphram 78. When the pumping action of the tire pressurizer increases the tire pressure sufficiently, the pressure against diaphram 78 will overcome the force of spring 74 and detent 76 and latch piece 72 will move rightward to its engaging position. If actuating member 20 is in its second position, latch piece 72 will engage notch 82, preventing substantial movement of the actuating member. If actuating member 20 is not in its second position, latch piece 72 will engage cam surface 84 and subsequently engage notch 82 on the next downstroke. The actuating member will remain locked and the pump inoperative until the ambient tire pressure decreases sufficiently to allow latch piece 72 to return to its non-engaging position.

Figure 6:
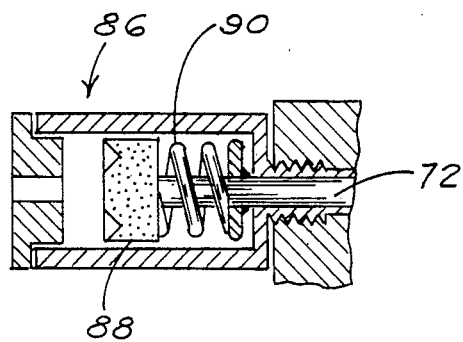
FIG. 6 is a cross sectional view of an alternative embodiment of the pressure regulator shown in FIG. 4.

An alternative form of pressure regulator is shown in FIG. 6. This pressure regulator 86 employs a piston in place of diaphram 78. Piston 88 is connected to latch piece 72 and serves to move it to its engaging position when the ambient pressure against the piston is sufficient to overcome the force of spring 90.

Figure 7:
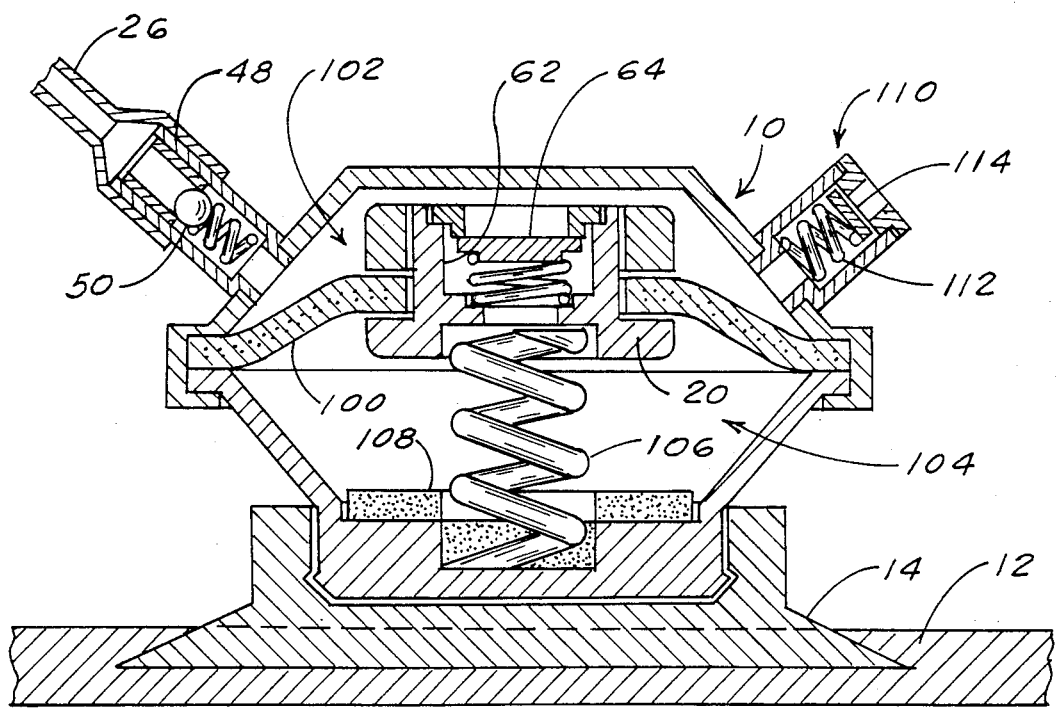
FIG. 7 is a cross sectional view of an alternative embodiment tire pressurizing means as in FIG. 4.

FIG. 7 shows an alternative embodiment of a tire pressurizer, employing a diaphram-type pump. In this embodiment a flexible diaphram 100 separates first and second pump chambers 102 and 104, respectively, in pump housing 10. The pump housing 10 is attached to tire 12 at base 14 in exactly the same manner as the previous embodiment. Actuating member 20 is attached to diaphram 100 and moves with the diaphram between a radially inward first position, shown in FIG. 7, and a radially outward second position. As in the embodiment of FIG. 4, the actuating member moves in a direction which is generally radial with respect to tire 12. The forces acting on actuating member 20 in the diaphram pump of FIG. 7 are the same as those described with respect to FIG. 2. A biasing spring 106 serves to urge the actuating member toward the upper position and centrifugal force urges the actuating member toward the lower position, against stop 108.

To pressurize a tire, air supplied through conduit 26 enters chamber 102 when the actuating member moves downward under the influence of centrifugal force. Simultaneously, air in chamber 104 is pressurized and forced into the tire through an outlet (not shown). When the actuating member returns to its first position, air in chamber 102 passes through passage 62 and check valve 64 into chamber 104 in the manner shown in FIG. 5.

An alternative type of pressure regulator is illustrated for use with the embodiment of FIG. 7. Pressure regulator 110 is a pressure responsive valve which admits ambient pressure from the interior of the tire into upper pump chamber 102 when a selected ambient pressure is reached. The pressure at which that occurs is determined by the strength of internal spring 112 which holds the valve closure 114 closed. Once pressurized ambient air is admitted into chamber 102, the movement of actuating member 20 is halted. Only when the tire pressure falls below the selected pressure and valve 114 closes does pumping action resume.

Both the piston and diaphram embodiments of the present invention offer significant advantages over prior art tire inflators. Because the power source is centrifugal force, the actuating member can be entirely enclosed in the pump housing, without the need for linkages or the like. Only one point of attachment to the tire is necessary, greatly simplifying installation. Although air is drawn in through a special passage in the valve stem to the pump of the present invention, it is also possible to use the conventional valve stem to pressurize the tire from an outside source of pressurized air.

Thus, the system is highly flexible and convenient. Furthermore, the system employs a minimum of moving parts and can be inexpensively made in a manner which is both lightweight and rugged.

Alternative embodiments are possible within the scope of the invention. Different types of biasing means and pressure regulators will occur to those skilled in the art, for example.

The invention provides an automatic tire inflator that is simple and rugged and operates without damaging impact between the inflator and the tire. The inflator automatically stops operating when the correct tire pressure reached. The inflator is also light in weight and easily installed in a pneumatic tire.

What is claimed is:

1. Pneumatic tire pressurizing means for automatically pressurizing a load-bearing tire during the rotation thereof, comprising a pump housing, an attaching base for attaching said pump housing to the interior surface of a tire at a location adjacent the exterior road contact surface of the tire, conduit means for supplying air from outside the tire to said pump housing, pump means in said pump housing for drawing air through said conduit means and for pressurizing the air for delivery to the interior of the tire, said pump housing and pump meams being entirely inside the tire and attached to the tire only by said attaching base, said pump means including an actuating member supported for movement relative to said pump housing in a direction generally radial with respect to the tire between a radially inward first position and a radially outward second position, and first biasing means for urging said actuating member toward said first position, wherein said pump housing is deflected from a circular orbital path around a rotating tire when said pump housing enters the flattened load-bearing portion on which a load-bearing tire rests, said first biasing means yielding to centrifugal force and inertia acting on said actuating member when said pump housing is deflected from a circular orbit to permit said actuating member to follow a different orbital path from said pump housing such that said pump housing and said actuating member are moved relative to one another toward said second position against the force of said first biasing means, said actuating member being subsequently returned to said first position by said first biasing means, whereby reciprocating relative motion is induced between said pump housing and said actuating member to operate said pump means during each rotational orbit of the tire.

2. Tire pressurizing means as in claim 1 in which said pump means includes first and second pump chambers within said pump housing, said actuating member being disposed between said pump chambers.

3. Tire pressurizing means as in claim 2 in which said first pump chamber communicates with said conduit means and movement of said actuating member from said first to said second position increases the volume of said first pump chamber and serves to draw air through said conduit means into said pump housing.

4. Tire pressurizing means as in claim 3 including means forming a first passage in said pump housing between said first and second pump chambers and first valve means for controlling the flow of air between said pump chambers, said first valve means being a one-way check valve disposed in said first passage which permits the flow of air only from said first pump chamber to said second pump chamber.

5. Tire pressurizing means as in claim 4 including means forming an outlet in said pump housing between said second pump chamber and the outside of said pump housing for air to exit and reenter said pump housing from the interior of a tire.

6. Tire pressurizing means as in claim 4 in which said passage in said pump housing is formed in said actuating member, said first valve means also being disposed in said actuating member and movable therewith.

7. Tire pressurizing means as in claim 1 in which said pump means further includes pressure regulator means responsive to the ambient pressure surrounding said pump housing for halting the operation of said pump means when a selected ambient pressure is reached.

8. Tire pressurizing means as in claim 2 in which said actuating member is a piston slidably disposed in said pump housing between said first and second chambers.

9. Tire pressurizing means as in claim 1 in which said pump means includes pressure regulator means responsive to the ambient pressure surrounding said pump housing for halting the operation of said pump means when a selected ambient pressure is reached, said pressure regulator means including a latch piece for preventing substantial movement of said actuating member, said latch piece being movable between engaging and nonengaging positions and being operated by pressure sensor means responsive to the ambient pressure around said pump housing.

10. Tire pressurizing means as in claim 9 in which said pressure sensor means includes a diaphram which is exposed to ambient air on one side thereof.

11. Tire pressurizing means as in claim 9 in which said pressure sensor means includes a piston which is exposed to ambient air on one side thereof.

12. Tire pressurizing means as in claim 2 in which said first and second pump chambers are separated by a flexible diaphram in said pump housing, said pump means including means responsive to the movement of said actuating member for moving said diaphram to produce pumping action to operate said pump means.

13. Tire pressurizing means as in claim 12 in which said actuating member is attached to said diaphram within said pump housing and is movable therewith.

14. Tire pressurizer means as in claim 12 in which said first pump chamber is in communication with said conduit means and serves to draw low pressure air from outside the tire into said pump housing when said member moves from said first to said second positions, said pump means further including pressure regulator means responsive to the ambient pressure surrounding said pump housing for halting the operation of said pump means when a selected ambient pressure is reached, said pressure regulator means including a pressure responsive valve for admitting ambient pressurized air from the interior of said tire into said first pump chamber when the selected ambient pressure is reached.

15. Tire pressurizer means as in claim 1 including a tire inlet valve for use in pressurizing a tire from an outside source which includes means connected to said conduit means for admitting air into said conduit means such that a tire may be pressurized either by an outside source of pressurized air or by said tire pressurizing means.

16. A method of pressurizing a pneumatic tire during rotation thereof while the tire is supporting a load, using a pump means which includes a pump housing and which is actuated by relative movement between the pump housing and an acutating member supported for movement relative to the pump housing, comprising the steps of: attaching said pump housing to the interior surface of a tire by means of an attaching base on said pump housing, locating said attaching base adjacent the exterior road contact surface of the tire such that the pump housing and pump means are entirely inside the tire and are attached to the tire only by said attaching base, providing a supply of air from outside the tire to said pump means, orienting the actuating member which is movable to actuate said pump means for movement in a direction generally radial with respect to the tire between a radially inward first position and a radially outward second position, urging said actuating member toward said first position using yieldable first biasing means, rotating the tire while the tire supports a load such that a flattened load-bearing portion of the tire periphery exists, carrying said pump housing and actuating member around with the rotating tire such that the pump housing follows a non-circular orbital path which deflects the pump housing from a circular orbit at the flattened load-bearing portion, permitting the actuating member to follow a different orbital path from the pump housing in response to centrifugal force and inertia which causes the pump housing and the actuating member to move relative to one another toward said second position against the force of the first biasing means, and subsequently returning said actuating member to said first position by the force of said first biasing means, whereby reciprocating relative motion is induced between the pump housing and the actuating member to operate the pump means during each rotational orbit of the tire.

17. A method as in claim 16 including the step of sensing the pressure of the ambient pressurized air surrounding the pump housing and halting the movement of said actuating member when a selected ambient pressure is reached.

* * * * *